United States Patent [19]
Simpson

[11] 3,937,148
[45] Feb. 10, 1976

[54] VIRTUALLY ZERO POWER LINEAR MAGNETIC BEARING

[75] Inventor: Paul A. Simpson, Woburn, Mass.

[73] Assignee: Cambridge Thermionic Corporation, Cambridge, Mass.

[22] Filed: Aug. 5, 1974

[21] Appl. No.: 494,943

Related U.S. Application Data

[63] Continuation-in-part of Ser. No. 320,430, Jan. 2, 1973, abandoned.

[52] U.S. Cl. .............................. 104/148 MS; 308/10
[51] Int. Cl.² .......................................... B61B 13/08
[58] Field of Search. 104/148 MS, 148 LM, 148 SS; 308/10

[56] References Cited
UNITED STATES PATENTS

| | | | |
|---|---|---|---|
| 3,559,759 | 2/1971 | Hart | 104/23 FS |
| 3,638,093 | 1/1972 | Ross | 104/148 MS |
| 3,783,794 | 1/1973 | Gopfert | 104/148 MS |
| 3,809,433 | 5/1974 | Mulasmajic | 104/148 MS |
| 3,860,300 | 1/1975 | Lyman | 308/10 |

Primary Examiner—Trygve M. Blix
Assistant Examiner—Reinhard J. Eisenzopf
Attorney, Agent, or Firm—Roger Norman Coe; Thomas M. Ferrill, Jr.

[57] ABSTRACT

A linear magnetic bearing provides magnetic support by means of permanent magnets and control by means of electromagnets and an electronic control system such that virtually zero power is required to maintain the bearing in suspension. Persisting net force producing electric energization of the electromagnets resulting from displacement of the bearing causes the energization to be augmented to reposition the bearing to an oppositely displaced position of substantial equilibrium with minimized net force producing electric energization of the electromagnets. The linear magnetic bearing is effectively utilized in one application to significantly reduce the power requirements for magnetic levitation vehicles.

15 Claims, 10 Drawing Figures

PRIOR ART

Fig. 1

PRIOR ART

_Fig. 7_

_Fig. 8_

_Fig. 6_

VIRTUALLY ZERO POWER LINEAR MAGNETIC BEARING

CROSS-REFERENCE TO RELATED APPLICATION

This application is a continuation-in-part of application Ser. No. 320,430, filed Jan. 2, 1973, now abandoned.

FIELD OF THE INVENTION

The present invention relates to a linear magnetic bearing and, more particularly, to linear magnetic bearings capable of virtually zero power magnetic suspension.

BACKGROUND OF THE INVENTION

A new breed of mass transit facilities has been created to help alleviate the growing world-wide transportation problem which manifests itself in choked highways, saturated air lanes and financially floundering railroads. Particular attention has been directed to tracked air cushion vehicles (TACVs), which are similar to the Hovercraft air cushion vehicles in commercial service across the English Channel, and magnetic levitation vehicles (MAGLEVs), which are train-like vehicles suspended over a track by magnetism and propelled by a linear induction motor.

The TACV is essentially a combined passenger and power unit that is lifted off its guideways by powerful, downward thrusting fans which create an air cushion to virtually eliminate friction. Such units can be propelled forward by one of several means over a suitable track or guideway. A preferred means of propelling TACVs is the virtually noiseless and nonpolluting linear induction motor (LIM) such as that recently successfully tested by the British at Erith. Other propelling methods have involved the use of noisy propellers. A TACV operated in France near Orleans straddles a center rail as its guideway and uses a turbine-driven propeller to supply forward thrust.

Figure 1:
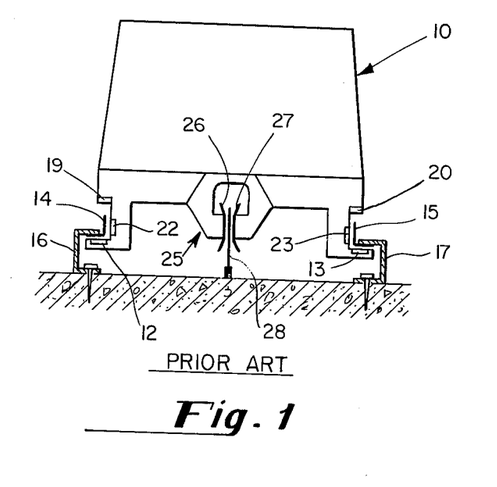
FIG. 1 is a highly schematic drawing of a prior art MAGLEV which utilizes electromagnets for suspension and a LIM for propelling the MAGLEV forward, part of the track being shown in cross-section.

Demonstrations in Germany established the feasibility and many of the advantages of MAGLEVs. At the German demonstrations a five-ton car was suspended by electromagnets and propelled by a LIM at speeds up to 40 miles per hour over an L-shaped experimental track. The apparatus used to magnetically suspend and propel the car is illustrated in FIG. 1. Basically, car 10 is suspended by powerful electromagnets 12 and 13 which face upward and pull against the underside of L-shaped rails 14 and 15. The rails are mounted on U-shaped brackets 16 and 17, respectively, to form the track or guideway. When electromagnets 12 and 13 are de-energized car 10 sets down against the top of the rails on skid blocks 19 and 20. A separate set of magnets 22 and 23 face the vertical surface of rails 14 and 15 to provide necessary lateral guidance. Car 10 is propelled by LIM 25 which reacts against a stationary aluminum plate (rotor) 28 to drive the car forward. LIM 25 is also used to apply necessary braking force to car 10.

Electromagnets 12 and 13 for the MAGLEV illustrated by FIG. 1 must be continuously activated in order to maintain suspended car 10 in the desired position. Very large steady state currents are required by the electromagnets in order to effect the necessary control. Because of the steady state current requirements, various inherent problems such as thermal problems, size and weight problems and power supply problems must be considered when attempting to obtain a practical self-contained suspension system which can be used in connection with a MAGLEV.

Figure 2:
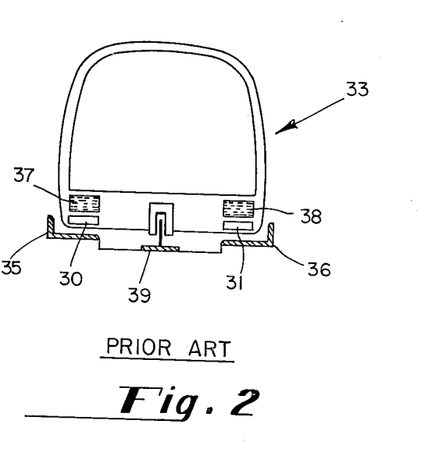
FIG. 2 is a highly schematic drawing illustrating a proposed MAGLEV which would use superconducting magnets to magnetically suspend the MAGLEV above an aluminum guideway and a LIM for propulsion, the aluminum guideway and an aluminum thrust rail for the linear induction motor being shown in cross section.

Alternate means, which has been proposed for magnetically suspending a vehicle but perhaps not constructed, is illustrated in FIG. 2 in which superconducting magnets 30 and 31 are suggested for suspending MAGLEV 33 over aluminum roadway 35 and 36 by eddy current repulsion. According to this proposed system the magnetic field is provided by magnets 30 and 31 which are cooled by cryogenic material, such as liquid helium 37 and 38, stored on board. In addition to the stored helium, gaseous helium would have to be refrigerated to a liquid by an onboard refrigeration system. It is intended that as long as the refrigeration is maintained the magnets should support the MAGLEV. Wheels, not shown, are proposed to be provided for travel at speeds 35–40 miles per hour and/or in case the refrigeration system should fail. A LIM with stator 39 is proposed for propelling MAGLEV 33.

Since there is no physical contact between a MAGLEV and the roadway, other than collector shoes which wipe against one or more rails, the power rail(s) and collector shoes are the only parts which are subject to wear and which can cause noise. The absence of mechanical loading means that a minimum of track maintenance is required. Another distinct advantage of the MAGLEV is its safety. The magnetic suspension system can be designed, as in FIG. 1, to lie beneath the track to help prevent derailment in the event of a crash.

MAGLEVs require less power and are generally quieter than TACVs. Although electromagnetic suspension systems require only about one-seventh the power needed by Hovercraft type vehicles, electromagnetic suspension systems still require a great amount of electric power for magnetic support. Accordingly, one of the principal problems with electromagnetic suspension systems designed for MAGLEVs has been the need for devising a way of continually supplying the correct amount of electromagnetic force to keep the system properly positioned. The required electromagnetic force varies with changes in vehicle load, speed, centrifugal force built up on curves, and the like. Cryogenic magnet systems proposed for suspending MAGLEVs offer theoretical direct electrical power advantages but entail disadvantages in other respects. The cryogenic systems for such vehicles require large amounts of power to operate the cooling system which must maintain the liquid helium at a temperature of about 4°K.

The revolutionary development of a magnetic suspension system requiring virtually zero power, as set forth in copending Lyman application Ser. No. 317,047, filed Dec. 20, 1972 now U.S. Pat. No. 3,860,300, has made it possible to develop a virtually zero power linear magnetic bearing which can be used to support MAGLEVs.

SUMMARY OF THE INVENTION

An object of the present invention is to provide improved and more efficient magnetic levitation vehicles.

Another object of the present invention is to provide a linear magnetic bearing capable of magnetic support using permanent magnets and an electronic control system in such a manner that virtually zero power is required for the system under its steady-state conditions.

A further object of the present invention is to eliminate linear magnetic damping with respect to magnetic levitation vehicles by the use of rails which prevent the formation of eddy currents.

Still a further object of the present invention is to provide an economical and practical magnetic levitation vehicle.

Yet another object of the present invention is to provide a system of virtually zero power linear magnetic suspension.

In accordance with the present invention, a virtually zero power linear magnetic bearing is provided using permanent magnets and an electronic control system for regulating electromagnets. The electronic control system functions to move the linear magnetic bearing to a neutral force position where power supplied to the electromagnets of the bearing is then substantially reduced or discontinued. Such linear magnetic bearings can advantageously be used to suspend magnetic levitation vehicles. An economical and practical MAGLEV can be operated by utilizing linear magnetic bearings for suspension, particularly when a LIM and laminated rails are used.

BRIEF DESCRIPTION OF THE DRAWINGS

Other and further objects, advantages and features of the invention will be apparent to those skilled in the art from the following detailed description thereof, taken in conjunction with the accompanying drawings, in which.

DESCRIPTION OF THE PREFERRED EMBODIMENTS

Figure 3A:
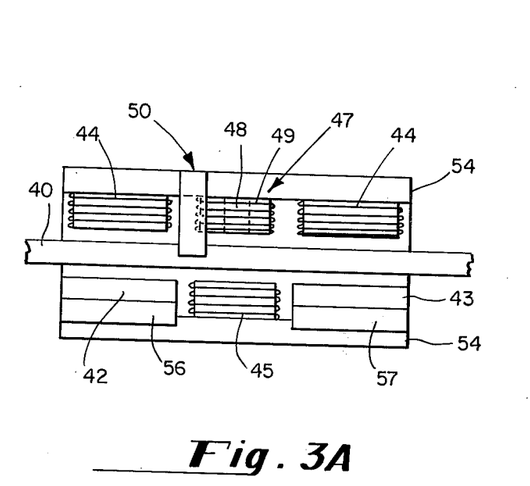
FIGS. 3A and 3B are highly schematic drawings of the side and end views, respectively, of a virtually zero power linear magnetic bearing in accordance with the present invention.
Figure 3B:
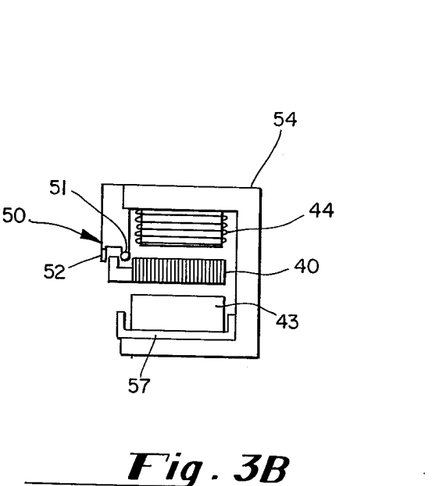

The virtually zero power linear magnetic bearing (VZPLMB) in accordance with the present invention is unique with respect to other magnetic systems in that it requires virtually zero power for controlled magnetic suspension under steady-state conditions. A typical configuration of a VZPLMB is illustrated in FIGS. 3A and 3B. As seen in these figures, the VZPLMB comprises a laminated steel rail 40 in a fixed, substantially horizontal position. Under the rail are permanent magnets 42 and 43. Force coils 44—44, which can comprise a winding around two magnet poles, are positioned directly over magnets 42 and 43 on the opposite side (top) of rail 40. In addition, at least one auxiliary force coil 45 is positioned below rail 40 adjacent to permanent magnets 42 and 43. A rate sensor 47, consisting of permanent magnet 48 and rate sensor coil 49 surrounding magnet 48, is shown above rail 40 and serves to sense the rate of upward and downward movement of the bearing. If desired, this rate sensor could be positioned below rail 40. Care should, however, be exercised in the separation of the rate sensing coil from the force coils in order to minimize inductive coupling. As magnet 48 moves nearer the ferrous material of rail 40 a voltage is developed in coil 49. This voltage is proportional to the relative velocity of the approach to the ferrous material and will have a polarity dependent upon the direction of the relative velocity or rate of change of distance between rail 40 and magnet 48. The bearing can be maintained such that the gap between rate sensor 47 and rail 40 is approximately one-quarter to one-half inch.

Permanent magnets 42 and 43 are attracted to rail 40. Upward acceleration caused by all of the forces acting on the bearing, including the attraction of these magnets to steel rail 40, is sensed by rate sensor 47 which through an electronic control system, described hereinbelow, energizes force coils 44—44 sufficiently to cause an opposite downward force. The upward acceleration is thereby canceled and the downward force is applied until a new neutral force position is achieved where magnetic support is provided solely by permanent magnets 42 and 43. Similarly, force coil 45 is energized to cancel any downward acceleration of the bearing and achieve a new neutral force position in the opposite direction.

Without the presence of the electronic control system the magnetic attraction of permanent magnets 42 and 43 could cause these magnets to come into contact with rail 40. Accordingly, displacement sensor 50, comprising lamp 51 and photocell 52, is employed to sense the position of rigid frame 54 to which force coils and magnets are attached. Displacement of permanent magnets 42 and 43 toward the rail, as sensed by sensor 50, causes a high current to be applied to force coils 44—44 and/or less current to be applied to coil 45. Once suspended, rate sensor 47 will sense acceleration up or down and feed this information back to an electronic control system in order to activate or deactivate force coils 44—44 differentially relative to force coil 45 (as required) to nullify the acceleration and achieve a new neutral position. If desired, the displacement input component to the force coils can be discontinued once the bearing has attained a new neutral force or zero acceleration position. The force coils are then regulated by supplying the rate component to the biased electronic control system of the bearing.

Under steady state conditions, two equal forces exist in theory. The force of gravity exists in a downward direction and this must be canceled by the upward force of the permanent magnets. Force coils are used to maintain the suspended body in a position with respect to rail 40 of neutral force or zero acceleration. One manner of accomplishing this is by super-imposing an integrated control signal bias on each amplifier used in the electronic control system. Thus, the differential force of the force coils can be adjusted to increase much more steeply than that necessary to restore stability of the overall bearing. These force coils can be so regulated to control the velocity of the bearing, reduce the velocity to zero and even reverse the direction of the bearing until it is once again coincident with a neutral force or zero acceleration position. At the new neutral force or zero acceleration position the force coils are not needed since the permanent magnets exactly counter the gravitational forces and other forces involved. Once the bearing has been properly positioned in a neutral or zero force position virtually zero power is required to maintain it in that position. The only power then being dissipated is the quiescent power in the electronic control system. This means that relatively large amounts of power are used in the force coils only when the bearing moves away from a neutral or zero net electro-magnetic force position or the steady-state conditions are otherwise interrupted.

Figure 4:
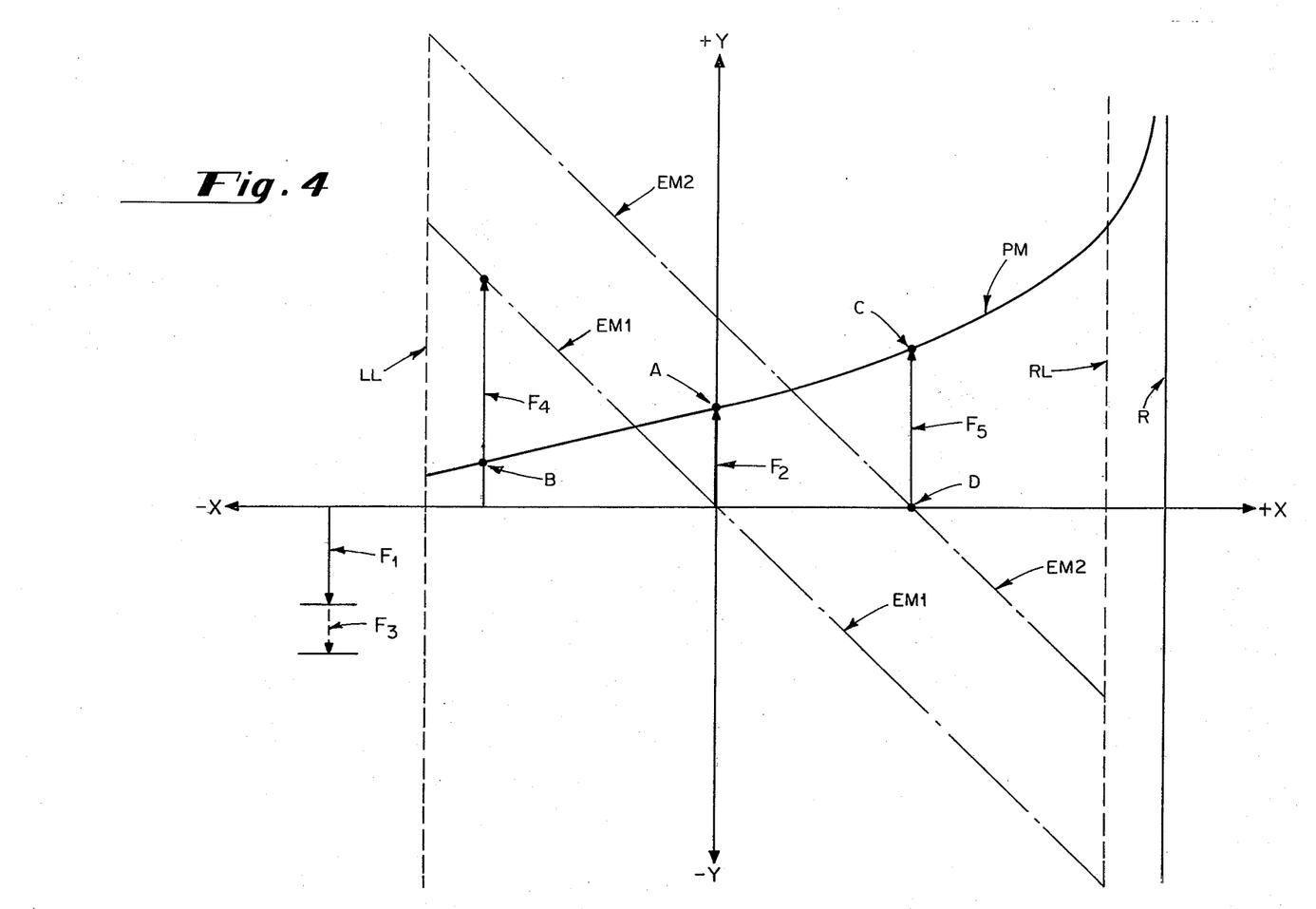
FIG. 4 is a graphical representation of the forces involved in a virtually zero power linear magnetic bearing.

The concept involved can be visualized by referring to FIG. 4 in which displacement (on the X-axis) is plotted against force (on the Y-axis). In FIG. 4 curve PM represents the net force of the permanent magnets and line EM1 represents the net force of the electromagnets. The initial slope of line EM1 is much greater than the initial slope of curve PM in order that a linear magnetic bearing can be maintained within practical limits (represented by dashed lines LL and RL). If the linear magnetic bearing is not kept within the limit represented by dashed line RL it might reach line R where the displacement is such that the gap between the rail and the linear magnetic bearing becomes zero and contact between rail and bearing is made. At that point the linear magnetic bearing is no longer magnetically suspended. The right limit represented by dashed line RL can be selected to be the point where the distance between the rail and the linear magnetic bearing is a gap of about one-sixteenth of an inch. The left limit represented by dashed line LL can be selected by practical considerations to be the location where the gap between the rail and the linear magnetic bearing is five-eighths of an inch. For the purpose of the graphical representation set forth in FIG. 4 the normal position of the linear magnetic bearing is selected to be point A at which a gap between the linear magnetic bearing and the rail is approximately three-eighths of an inch.

If it is assumed that the only downward forces exerted on the linear magnetic bearing are forces of gravity represented by vector $F_1$, then the upward and opposing force of the permanent magnets as indicated by force vector $F_1$ would exactly counteract force vector $F_2$ at position A. Other forces, however, may act upon the linear magnetic bearing. Such forces include additional weight applied to the linear magnetic bearing, centrifugal force, and the like. For example, if additional force represented by dotted force vector $F_3$ is added to the downward force represented by force vector $F_1$ the linear magnetic bearing would tend to move toward point B. Movement in this direction, however, would immediately bring an electromagnetic restoring force into play in order to counteract the displacement. If the linear magnetic bearing ever reached point B a restoring force of the electromagnets represented by vector $F_4$ (many times greater than the force represented by vector $F_3$) would be acting upon the linear magnetic bearing. Due to the slope of line EM1 the restoring force opposing displacement along the x axis is such that the rate of displacement can be slowed and reduced to zero. As the force causing displacement (represented by vector $F_3$) continues, the biased electromagnet system causes the linear magnetic bearing to move to a new (oppositely displaced) zero or neutral force position C where the force represented by vector $F_5$ is equal and opposite to the combined downward force represented by vectors $F_1$ and $F_3$. Upon reaching the new zero or neutral force position C, line EM2 (passing through point D) would represent the new net force contribution of the electromagnets as a function of displacement relative to that new zero force position. Accordingly, at position C the opposing forces are once again balanced and the electromagnets are not required to make any major net force contribution until some new force causes displacement from the new zero or neutral force position. Under such conditions, virtually zero power linear magnetic suspension is achieved. This description is applicable to a single one of the plural bearing units.

A steel backing plate, such as plates 56 and 57 (see FIGS. 3A and 3B), can be used as illustrated in connection with magnets 42 and 43 to increase the force of those magnets. Rail 40 is laminated or made of ferrite material to prevent eddy current damping. The laminations are made parallel to the magnetic field much like a transformer. This means that magnetic friction is substantially eliminated, a fact that is of a particular importance when the VZPLMB is used in connection with a MAGLEV. Due to the fringing effect of the permanent magnets sideway control is passive. Nevertheless, if desired, separate magnets can be used to effect lateral guidance.

Figure 5A:
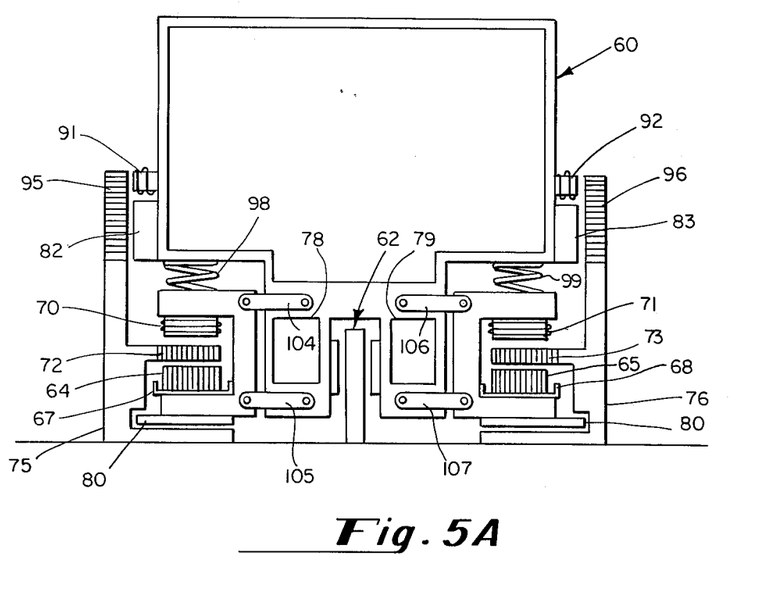
FIGS. 5A and 5B are highly schematic drawings of the end and side views, respectively, of a MAGLEV which utilizes virtually zero power linear magnetic bearings in accordance with the present invention.
Figure 5B:
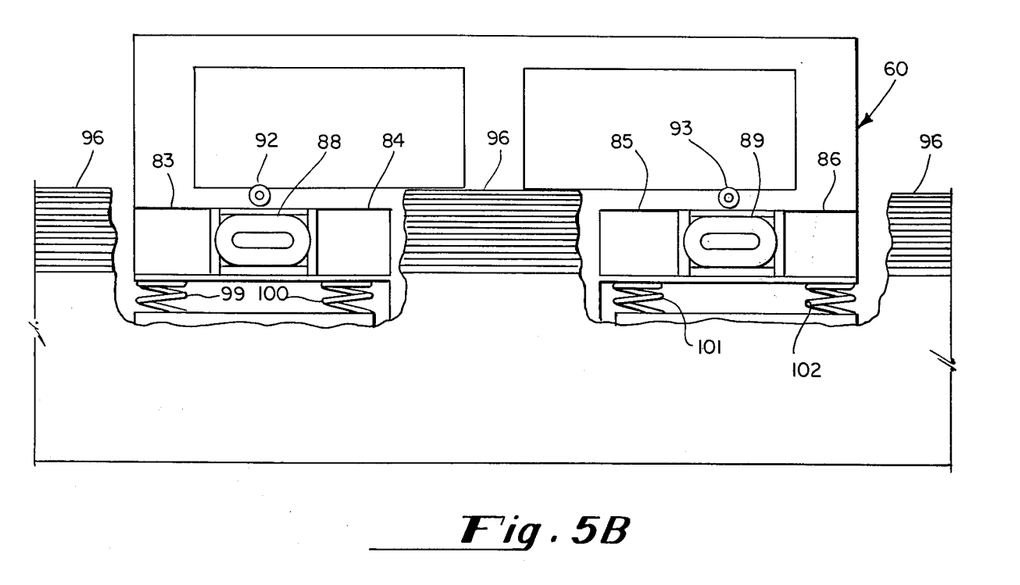

Referring to FIGS. 5A and 5B, which are schematic illustrations, not to scale, a MAGLEV for transporting people is illustrated employing the VZPLMB of the present invention. FIG. 5B is a side view of the front and rear portions of the right side of vehicle 60 illustrated in FIG. 5A. Vehicle 60 can be propelled by LIM 62, energized via shoes contacting power rails (not shown). LIM 62 comprises a linear inductive polyphase motor field unit which induces current in a conductive ribbon (like a rotor) to create the desired interaction with current loops tending to be induced and moved rearward in the ribbon whereby forward thrust is imparted to the vehicle. In order to support a vehicle large enough for transporting people very powerful permanent magnets 64 and 65 are required. For example, samarium cobalt or other rare earth permanent magnets can be used together with relatively small gaps between the rails, permanent magnets and force coils. The supporting force for 1 cubic foot of samarium cobalt magnetic material is 20,000 pounds at a gap of one-quarter inch. For a vehicle which weighs 5 tons designed to carry a load weighing 5 tons, one preferred configuration is to have each samarium cobalt magnet approximately 1 inch thick by 1 foot wide by 1½ feet long with a ⅛ inch steel backing plate (e.g., plates 67 and 68). It is also desirable that the steel backing overhang the magnetic material by at least one-half inch. It has been found that use of such a backing plate can double the force of the magnet.

FIG. 5A also illustrates the location of force coils 70 and 71 and their relationship to laminated rails 72 and 73, which are mounted on non-magnetic support posts 75 and 76. The VZPLMB control electronics are present in locations 78 and 79.

While the schematic illustration of FIG. 5A shows the use of skid plates 80—80 for use when vehicle 60 is at rest, it will be understood that any suitable system, such as a system using wheels, can be used to maintain the vehicle at a prescribed height when at rest. Extremely high starting power would be required by the electronic control system if the permanent magnets were allowed to come in contact with the rails. The force of the electromagnets with an open gap would have to exceed the force of the permanent magnets with a closed gap. Although not impossible, this force level would be difficult to achieve. Accordingly, skid plates 80—80 can be set to prevent the gap from becoming zero. Such skid plates or fixed wheels reduce the starting power which would otherwise be required.

Referring to FIG. 5A, in particular, it will be seen that not only are rails 72 and 73 laminated but also permanent magnets 64 and 65 are laminated. Lamination with respect to permanent magnets 64 and 65 can be made up of alternate layers of magnetic and non-magnetic material. If desired, the alternate layers of non-magnetic material in the permanent magnets can be made to correspond to alternate layers of non-magnetic material in the rails. Advantageously, the laminated rails are made slightly wider than the permanent magnets to help prevent sideward movement.

Separate control systems can be utilized in conjunction with the rail system to maintain vehicle 60 in a center position as it moves lineally. As seen in FIGS. 5A and 5B, separate virtually zero power control systems comprising permanent magnets 82, 83, 84, 85 and 86, electromagnets 88 and 89, displacement sensor 90, sensing coils 92 and 93, rail extension 94, and laminated rail extensions 95 and 96 can be used to counteract forces in a sideward direction. For the sideway control, two servo-operated control units suffice, one at or near each end of the vehicle 60. The sideway control at the front of vehicle 60 as seen in FIG. 5A includes unit 82 arranged to exert pull to the left and units 83 and 84 arranged to exert pull to the right, together with the displacement sensor 90 and rate sensor 92. The rate sensor coil 92 and displacement sensor 90 function in a manner similar to that described previously in connection with sensor coil 49 and displacement sensor 50, respectively, of FIGS. 3A and 3B. In other words, rate sensor coil 92 develops a voltage proportional to the relative velocity at which the front end of vehicle 60 approaches or moves away from laminated rail extension 96, with a polarity dependent upon direction of movement. Displacement sensor 90 utilizes a lamp and photocell arrangement 91 affixed to vehicle 60 to sense the position of rail extension 94. A similar displacement sensor (not shown) is at the rear of vehicle 90. The control circuitry for maintaining the front end of vehicle 60 at a neutral or zero force position between laminated rail extensions 95 and 96 can be substantially identical with that shown in FIGS. 7 and 8, one power amplifier 133 regulating the force coil winding adjacent unit 82 on the left side of vehicle 60 as seen in FIG. 5A, and the other power amplifier 135 regulating the force coil winding of electromagnet 88. One set of servo electronics is thus used to regulate the force coils at the front of the vehicle, i.e., for electromagnet 88 and its opposite counterpart (not shown), and an independent circuit is used to regulate electromagnet 89 and its opposite counterpart (not shown) at the rear of vehicle 60. When a neutral force position is achieved at the front of the vehicle, for example, the attraction of the permanent magnets, including permanent magnet 83, toward laminated rail member 95 counteracts the attraction of the opposite permanent magnets 83 and 84 toward laminated rail member 96. It will be understood that each side of the vehicle will be substantially the same and have a similar number and placement of permanent and electromagnets near each corner. The electromagnets and their control amplifiers responsive to the respective sensors so superimpose their action on the sideway permanent magnets as to overcome the inherent instability of permanent magnets used alone. Furthermore, when a sideway force is encountered, such as rounding an unbanked or insufficiently banked curve, the electromagnets of the control systems are called on extensively to maintain the position of the vehicle, in accordance with the above-described VZP principle. Moreover, the inherent damping of the system (vertically and horizontally) reduces sway and bounce due to any unevenness in the guideway or change in load. The vertical rails are laminated similarly to the horizontal rails to reduce eddy current losses.

Advantageously, the weight-supporting linear magnetic bearings are mounted on vehicle 60 by means which will allow the gaps between rails and permanent magnets to be as narrow as practicable, thereby producing the greatest lifting power in relation to size and strength of magnet units. One embodiment for accomplishing this and taking into account possible unevenness in the rails is illustrated in FIGS. 5A and 5B involving coil springs 98, 99, 100, 101 and 102 and hinged members 104, 105, 106 and 107. By employing such a spring system, preferably with viscous dampers, such as hydraulic shock absorbers, to overcome problems caused by unevenness in the track, for example, the permanent support magnets in each support unit can be maintained quite close to the track in an optimum position.

Figure 6:
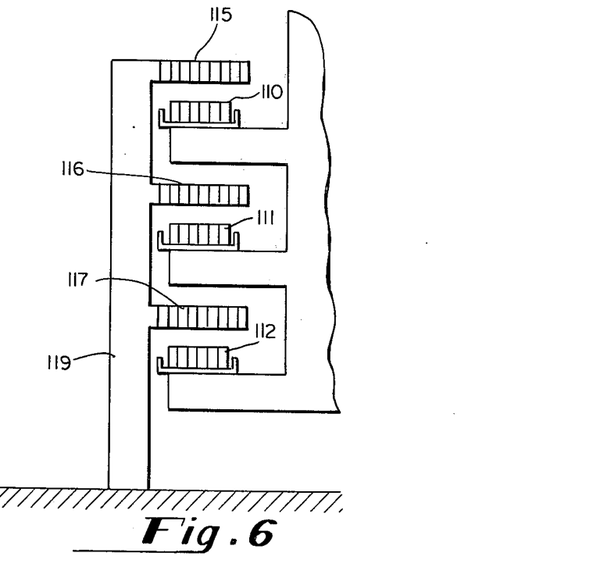
FIG. 6 is a highly schematic partial drawing illustrating an alternative embodiment of a rail for virtually zero power linear magnetic bearings.

To obtain maximum lifting power the rail system could be designed as illustrated in FIG. 6 where multiple permanent magnets 110, 111 and 112 are positioned relative to laminated rail members 115, 116 and 117, respectively, supported by member 119 which is constructed of a nonmagnetic material. One advantage of the arrangement set forth in FIG. 6 is the fact that the size of the permanent magnets can be reduced.

Figure 7:
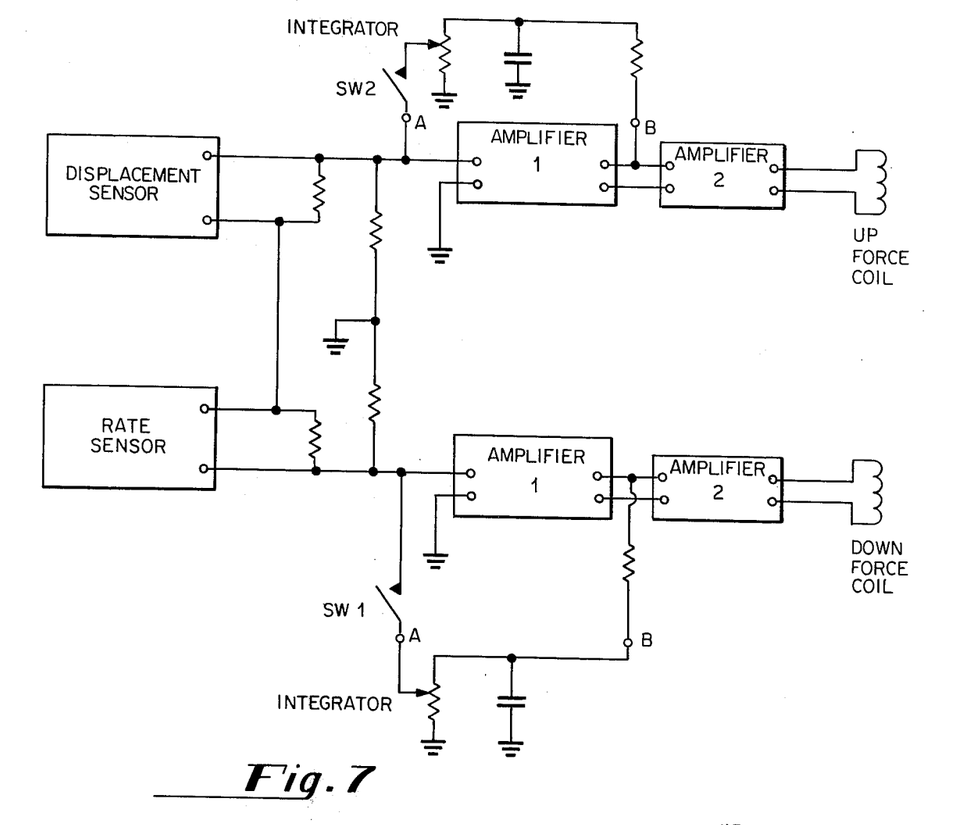
FIG. 7 is a diagram of an electronic control system for virtually zero power linear magnetic bearings of the present invention.

FIG. 7 illustrates, in block diagram form, one embodiment of a VZPLMB electronic control system. The outputs of the displacement and rate sensors 121 and 123 are added in series. These outputs are respectively dependent in magnitude and polarity on the displacement up or down (or from one side to the other) from the predetermined median magnetic gap and on the rate of change of the displacement. Assuming that switches SW1 and SW2 were open, the control of non-inverting amplifiers 125 and 127 would be solely in accordance with their respective halves of the algebraic sum voltage from the sensors, established across resistors 129 and 131, respectively. The outputs of noninverting amplifiers 125 and 127 control the input of the power amplifiers 133 and 135, respectively, which regulate the energization of the coils of the upward and downward (or left and right) force-exerting electromagnets, respectively.

Amplifiers 125 and 133 are so arranged as to provide energization of each of the force coil windings 149 which increases as the output from the displacement sensor 121 responds to increase of the gap of the suspension magnets from the predetermined gap thereof. In accordance with well-known practice, this output from the displacement sensor 121 is augmented by series-aiding output of the rate sensor 123 when the displacement from the predetermined median gap is increasing, and is diminished or overcome by the rate sensor output when the opposite rate of change prevails. Amplifiers 127 and 135 are primarily responsive to the opposite displacement from the median condition (displacement to a smaller than desired gap of the permanent magnets).

The virtually zero power contribution is provided by the integrator circuits shown as consisting in each instance of a series resistor and a shunt capacitor, the integrator associated with amplifier 125 including elements 137 and 139 and the other integrator including elements 141 and 143. Output potentiometers 145 and 147 participate along with the capacitors 139 and 143 in establishing the substantial time constants of the integrators, and also allow for setting the integrator outputs in proportion to the input signal potentials.

If the integrator contributions were switched off by leaving switches SW1 and SW2 open, the system would impose heavy demands on the electromagnets and their sources of control currents. Any persisting departure of the forces from ideal design conditions could require the substantial persisting energization of each up force coils and/or each down force coil (left force coil and/or right force coil) of the suspension control electromagnets.

In accordance with the virtually zero power principle, the circuits through SW1 and SW2 are completed, and the amplifiers 125 and 127 are so arranged and their outputs so sensed that a signal at the input of amplifier 125 due to downward movement (for example) of the suspended vehicle bearing unit from the predetermined median position is augmented by an aiding output of integrator 137, 139 and potentiometer 145. This so enhances and extends the energization of each up force coil as to move the bearing unit up through the neutral gap position to the opposite displacement condition represented schematically at D accompanied by force vector $F_5$ in FIG. 4, so as to shift to the permanent magnet portion of the suspension unit the burden of offsetting the increased downward-acting force represented by vector $F_3$ of FIG. 4.

A similar control circuit is to be provided for each bearing unit used for vertical control. The amplifiers for the system are constructed such that they provide a wide band of response.

Figure 8:
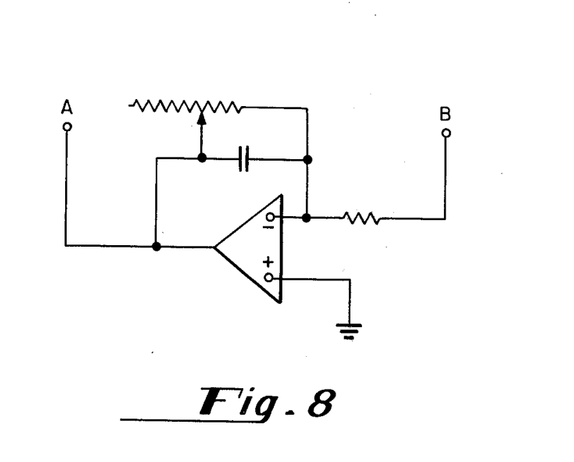
FIG. 8 is a diagram illustrating an alternative integrating circuit which can be used in the electronic control system of FIG. 7.

Another version of an integrator for achieving the virtually zero power effect is shown in FIG. 8. In this instance, an amplifier 153 is provided with a feedback path from its output terminal to its input terminal consisting of a resistor 155 and a capacitor 156 connected in parallel with the resistor, one resistor terminal being connected to the amplifier output connection and the other resistor terminal being connected to the amplifier input connection. This amplifier 153 is a phase inverting amplifier and in a steady state condition the resistance path from the output to the input terminal provides a predetermined limited amount of inverse feedback.

When the input signal received at the right side of series resistor 158 connected to the input to this amplifier changes appreciably (e.g., rises 1 volt) and that condition persists a long time, the resistor and capacitor feedback path will limit the amount by which the output voltage has increased in the opposite polarity by an amount determined by the resistance component of said feedback path. But with respect to shorter term effects, the fact that the voltage across the capacitor cannot immediately change prevents the voltage at the direct input terminal of the amplifier (i.e., at the left hand end of the series input resistor 158) from changing appreciably, restricting the change to a long term integrating action, and hence similarly restricting the change of the output of the amplifier 153 which is supplied as the integration component to inverting amplifier 1'.

This circuit of FIG. 8 can be used to replace the integrator-amplifier-force coil arrangement shown in FIG. 7 by making an appropriate attachment at point A, a pair of the FIG. 8 integrators being used per servo.

From the foregoing, it will be seen that this invention is well adapted to obtain all of the ends and objects hereinabove set forth, together with other advantages which are obvious and which are inherent to the system. In addition to its lower operating cost and better performance, the VZPLMB permits MAGLEVs to be constructed with all of the inherent advantages of such vehicles, including high-speed, safe, silent transportation. Although the magnets required for the VZPLMBs are initially expensive they are durable. Moreover, the magnets do not have air or noise pollution drawbacks in fact that makes such bearings ideal for MAGLEVs in urban areas.

As indicated above, a LIM having flat stator windings, instead of cylindrical windings as in a conventional motor, results in a magnetic field which moves in a straight line rather than in a circle. This induces the corresponding currents in a plate and imparts linear thrust to coils in a MAGLEV. Because of the particular construction of the rails for the VZPLMB, there is little magnetic friction to resist forward movement of a MAGLEV. Wind resistance and the operation of the LIM in reverse can be used to slow a MAGLEV down and effectively brake the vehicle. For emergencies, the vehicle can be operated on skids or wheels.

The permanent magnets utilized for the VZPLMB can constitute a single magnet or a number of magnets in any desired configuration. Provided the magnetic force is sufficiently great to oppose the gravitational force, it is obviously immaterial whether one or several magnets are employed. In addition to samarium cobalt other materials such as platinum cobalt can be used. Rare earth magnets can conveniently be designed as R Co magnets, it being understood that R includes not only 15 elements of atomic numbers 57 (lanthanum) through 71 (lutetium), but also their close chemical kin such as yttrium (atomic number 39) and scandium (atomic number 21). In addition, Sm $Co_{5-x}$ $Cu_x$ (where $x = 1$ to 4) magnets as well as other ternary compositions can be employed, including: Co Sm Pr; Co Cu Ce; Co La Sm and the like. In some instances mischmetal, the cerium rich rare earth alloy having the nominal composition 50 wt. % Ce, 27 wt. % La, 16 wt. % Nd, 5 wt. % Pr and 2 wt. % other rare earth metals, has been substituted for Sm in order to reduce costs. In some instances permanent magnets composed of Alnico 8 and other similar materials can be employed, especially when specially designed configurations are employed. Although emphasis has been placed on the use of permanent magnets in order to conserve power, electromagnets or supercooled magnets could be used in conjunction with the permanent magnets if desired. For example, additional electromagnets could be employed in conjunction with the permanent magnets when moving the bearing from an initial rest position to a zero or neutral force position where the force of the permanent magnets counteracts other forces applied to the bearing. However, as indicated above, in order to achieve suspension approaching zero power as a limit in accordance with the present invention, electromagnets have their steady-state contributions used primarily for control purposes.

Although two rails have been illustrated in the drawings it will be understood that the linear magnetic bearings of this invention could be used with only one rail, i.e., a monorail.

An alternative method which can be used for sensing the rate of displacement is an oscillator having a tank circuit coil placed near the steel rail. As the oscillator coil moves toward or away from the rail, the inductance of the coil changes giving corresponding change of the oscillator frequency $$f = \frac{1}{2\pi \sqrt{LC}},$$

where $L$ is total inductance in millihenrys and $C$ is total capacity in micro-farads. The frequency to voltage converter will then provide a voltage proportional to the rate of displacement.

Still another method of sensing the rate of displacement is to use a small, low power laser which when reflected off the rail would provide a measure of the displacement by the Doppler Effect. This type of system is used in industry to measure distances very accurately and would be immune to magnetic interference.

Obviously, many other modifications and variations of the invention as hereinbefore set forth may be made without departing from the spirit and scope thereof.

What is claimed is:

1. A magnetic levitation vehicle, which vehicle comprises:
    linear magnetic bearing means for suspending said vehicle; and
    means for propelling said vehicle along a guideway;
    wherein said linear magnetic bearing means comprises
    a frame for the linear magnetic bearing which frame is connected to the magnetic levitation vehicle to permit limited movement of the frame indepdent of said vehicle, said bearing frame at least partially surrounding a stationary element of said guideway;
    at least one permanent magnet attached to the bearing frame for suspending the bearing frame relative to said stationary element in a neutral force position in which the bearing frame is suspended entirely by the permanent magnet;
    means for sensing displacement of the suspended bearing frame relative to the stationary element away from the neutral force position; and
    electromagnet means attached to the bearing frame activated by said sensing means for counteracting forces causing displacement of the suspended bearing frame, for restoring the bearing frame to a new neutral force position and for deenergizing the electromagnet means when said bearing frame has been restored to said new neutral force position.

2. The magnetic levitation vehicle of claim 1 wherein the bearing frame is connected by a spring to the magnetic levitation vehicle.

3. The magnetic levitation vehicle of claim 1 wherein the bearing frame is hinged to the magnetic levitation vehicle.

4. A linear magnetic bearing, which comprises:
    a frame for the linear magnetic bearing, said bearing frame at least partially surrounding a stationary element;
    at least one permanent magnet attached to the bearing frame in a position for suspending the bearing frame relative to the stationary element in a neutral force position in which the bearing frame is suspended entirely by the permanent magnet;
    means for sensing displacement of the suspended bearing frame relative to the stationary element; and
    electromagnet means energized by said sensing means for counteracting forces causing displacement of the suspended bearing frame, for restoring the bearing frame to a new neutral force position and for de-energizing said electromagnet means when said bearing frame has been restored to said new neutral force position.

5. The linear magnetic bearing of claim 4 wherein the stationary element is a laminated rail.

6. The linear magnetic bearing of claim 4 wherein the stationary element is a ferrite rail.

7. The linear magnetic bearing of claim 4 wherein the means for sensing displacement of the suspended bearing frame relative to the stationary element includes means for sensing velocity of movement of the bearing frame.

8. The linear magnetic bearing of claim 4 wherein the permanent magnet is laminated and composed of alternating magnetic and nonmagnetic layers.

9. The linear magnetic bearing of claim 4 wherein the permanent magnet has a metal backing plate.

10. A magnetic levitation vehicle, which vehicle comprises:
    linear magnetic bearing means for suspending the magnetic levitation vehicle; and
    means for propelling the magnetic levitation vehicle along a quideway;
    wherein said linear magnetic bearing means comprises
    a frame for the linear magnetic bearing, said bearing frame at least partially surrounding a stationary element of said guideway;
    at least one permanent magnet attached to the bearing frame in a position for suspending the bearing frame vertically relative to the stationary element of said guideway in a neutral force position in which the bearing frame is suspended entirely by the permanent magnet;
    means for sensing vertical displacement of the suspended bearing frame relative to the stationary element of said guideway; and
    electromagnet means energized by said sensing means for counteracting forces causing vertical displacement of the suspended bearing frame, for restoring the bearing frame to a new neutral force position and for de-energizing said electromagnet means when said bearing frame has been restored to said new neutral force position.

11. The magnetic levitation vehicle of claim 10 wherein the means for propelling said vehicle along a guideway is a linear induction motor.

12. A magnetic levitation vehicle which comprises:
    a linear induction motor for propelling said vehicle along at least one rail; and linear magnetic bearing means for suspending said magnetic levitation vehicle, said bearing comprising a frame for the linear magnetic bearing, said bearing frame at least partially surrounding a rail;

at least one rare earth permanent magnet attached to the bearing frame in a position for suspending the bearing frame relative to the rail in a neutral force position in which the bearing frame is suspended entirely by the rare earth permanent magnet;

means for sensing displacement of the suspended bearing frame relative to the rail;

electromagnet means energized by said sensing means for counteracting forces causing displacement of the suspended bearing frame, for restoring the bearing frame to a new neutral force position and for de-energizing said electromagnet menas when said bearing frame has been restored to said new neutral force position.

13. The magnetic levitation vehicle of claim 12 wherein both the permanent magnet and rail are laminated and composed of alternate magnetic and nonmagnetic layers.

14. The magnetic levitation vehicle of claim 12 wherein a steel backing plate is attached to each permanent magnet.

15. A magnetic levitation vehicle, which vehicle comprises:

linear magnetic bearing means for suspending said vehicle; and means for propelling said vehicle along a guideway having stationary vertical and horizontal extensions;

wherein said linear magnetic bearing means comprises a frame for the linear magnetic bearing which frame is connected to the magnetic levitation vehicle to permit limited movement of the frame independent of said vehicle, said bearing frame at least partially surrounding the stationary horizontal extention of said guideway;

at least one permanent magnet attached to the bearing frame for suspending the bearing frame relative to said stationary horizontal guideway extension force position in which the bearing frame is suspended entirely by the permanent magnet;

means for sensing displacement of the suspended bearing frame relative to the stationary horizontal guideway extension away from the neutral force position;

electromagnet means attached to the bearing frame activated by said sensing means for counteracting forces causing displacement of the suspended bearing frame, for restoring the bearing frame to a new neutral force position and for de-energizing the electromagnet means when said bearing frame has been restored to said new neutral force position relative to the horizontal guideway extension;

at least one permanent magnet attached to the vehicle for suspending the vehicle relative to said stationary vertical guideway extension in a neutral force position;

means for sensing displacement of the vehicle relative to the stationary vertical guideway extension away from the neutral force position; and electromagnet means attached to the vehicle activated by said means sensing vehicle displacement relative to the stationary vertical guideway extension for counteracting forces causing such displacement of the vehicle, for restoring the vehicle to a new neutral force position relative to the stationary vertical guideway extension and for de-energizing the electromagnet means attached to the vehicle when said vehicle has been restored to said new neutral force position relative to the stationary vertical guideway extension.

* * * * *